US011838755B2

(12) United States Patent
Kang et al.

(10) Patent No.: US 11,838,755 B2
(45) Date of Patent: Dec. 5, 2023

(54) TECHNIQUES FOR SECURE AUTHENTICATION OF THE CONTROLLED DEVICES

(71) Applicant: Korea University Research and Business Foundation, Seoul (KR)

(72) Inventors: Dayoung Kang, Seoul (KR); Jin-Young Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 262 days.

(21) Appl. No.: 17/328,158

(22) Filed: May 24, 2021

(65) Prior Publication Data

US 2021/0377732 A1 Dec. 2, 2021

(30) Foreign Application Priority Data

May 28, 2020 (KR) ........................ 10-2020-0064585

(51) Int. Cl.
*H04W 12/06* (2021.01)
*H04W 12/03* (2021.01)
(Continued)

(52) U.S. Cl.
CPC ........... *H04W 12/06* (2013.01); *H04L 9/0643* (2013.01); *H04L 9/0838* (2013.01);
(Continued)

(58) Field of Classification Search
CPC ..... H04W 12/06; H04W 12/03; H04W 12/40; H04L 9/0643; H04L 9/0838;
(Continued)

(56) References Cited

U.S. PATENT DOCUMENTS 6,721,886 B1 * 4/2004 Uskela .................. H04W 12/06
713/168
9,510,171 B1 * 11/2016 Sill ........................ H04W 4/90
(Continued)

FOREIGN PATENT DOCUMENTS

KR 10-2008-0028198 A 3/2008
KR 10-2009-0004896 A 1/2009
(Continued)

OTHER PUBLICATIONS

Qureshi, Abdul Haleem, and Muhammad Usman. "An optimal mutual authentication scheme in GSM networks." 2011 International Conference on Information and Communication Technologies. IEEE, 2011, 5 pages. (Year: 2011).*

(Continued)

*Primary Examiner* — Catherine Thiaw
(74) *Attorney, Agent, or Firm* — NSIP Law

(57) ABSTRACT

According to an exemplary embodiment of the present disclosure, a computer program stored in a computer readable storage medium is disclosed. The computer program includes commands which cause a processor of a control device to execute steps below, the steps including: acquiring International Mobile Station Identity (IMSI) related to a Subscriber Identity Module (SIM) and location information of a controlled device from the controlled device; calculating a hash value obtained by hashing the IMSI by using a hash function; generating first signature data in which the hash value and the location information are encrypted with a private key of the control device by using an asymmetric key algorithm; generating first encryption data obtained by encrypting the first signature data with a public key of a home subscriber server by using the asymmetric key algorithm; and transmitting a connection request message (Continued)

including the first encryption data to the home subscriber server.

19 Claims, 11 Drawing Sheets

(51) Int. Cl.
　　*H04W 12/40*　　　(2021.01)
　　*H04L 9/06*　　　　(2006.01)
　　*H04L 9/08*　　　　(2006.01)
　　*H04L 9/32*　　　　(2006.01)
　　*H04L 9/40*　　　　(2022.01)

(52) U.S. Cl.
　　CPC .......... *H04L 9/0861* (2013.01); *H04L 9/0894* (2013.01); *H04L 9/3236* (2013.01); *H04L 9/3247* (2013.01); *H04L 63/0442* (2013.01); *H04W 12/03* (2021.01); *H04W 12/40* (2021.01); *H04L 2209/80* (2013.01)

(58) Field of Classification Search
　　CPC ... H04L 9/0861; H04L 9/0894; H04L 9/3236; H04L 9/3247; H04L 63/0442; H04L 2209/80
　　See application file for complete search history.

(56) References Cited

U.S. PATENT DOCUMENTS

| 9,768,966 | B2 | 9/2017 | Krahn et al. | |
|---|---|---|---|---|
| 2007/0249352 | A1 | 10/2007 | Song et al. | |
| 2014/0219448 | A1* | 8/2014 | Froels | H04L 9/14 380/255 |
| 2018/0013568 | A1* | 1/2018 | Muhanna | H04L 9/0825 |
| 2018/0152845 | A1* | 5/2018 | Unnerstall | G06Q 20/3224 |
| 2019/0007376 | A1* | 1/2019 | Norrman | H04L 63/0876 |
| 2021/0136595 | A1* | 5/2021 | Hashemi | B64C 39/024 |

FOREIGN PATENT DOCUMENTS

| KR | 10-1537893 B1 | 7/2015 |
|---|---|---|
| KR | 10-1625037 B1 | 5/2016 |
| KR | 10-2016-0086148 A | 7/2016 |
| KR | 10-2017-0019308 A | 2/2017 |
| KR | 10-1835076 B1 | 4/2018 |
| KR | 10-2019-0026230 A | 3/2019 |

OTHER PUBLICATIONS

Gail L. Grant "Understanding Digital Signatures", by Grant, 1998, McGraw Hill, excerpts p. 33-36 (Year: 1998).*
K. Norrman, M. Näslund, E. Dubrova, "Protecting IMSI and user privacy in 5G networks", in Proceedings of the 9th EAI International Conference on Mobile Multimedia Communications (2016), pp. 159-166: (Year: 2016).*
Alezabi, Kamal Ali, et al. "An efficient authentication and key agreement protocol for 4G (LTE) networks." 2014 IEEE Region 10 Symposium. IEEE, 2014, 6pages. (Year: 2014).*
F. Van Den Broek, R. Verdult, J. de Ruiter, "Defeating IMSI catchers", in Proceedings of the 22nd ACM SIGSAC Conference on Computer and Communications Security (2015), pp. 340-351 (Year: 2015).*
Netmanias., "EMM Procedure 1. Initial Attach—Part 2. Call Flow of Initial Attach", *Netmanias Technical Documents*, Jan. 16, 2014 (pp. 1-23).

* cited by examiner

TECHNIQUES FOR SECURE AUTHENTICATION OF THE CONTROLLED DEVICES

CROSS-REFERENCE TO RELATED APPLICATIONS

This application claims priority to and the benefit of Korean Patent Application No. 10-2020-0064585 filed in the Korean Intellectual Property Office on 28 May 2020, the entire contents of which are incorporated herein by reference.

TECHNICAL FIELD

The content of the present disclosure relates to a technique for security authentication of a controlled device, and more particularly, to a security authentication technique which improves security for International Mobile Station Identity (IMSI) of a controlled device.

BACKGROUND ART

LTE is an abbreviation for Long-Term Evolution and is a $4^{th}$-generation mobile communication technology. The LTE is designed for high-speed transmission, reduction of cost per bit, low transmission delay, applicability of an existing frequency band, and the like, and is currently being introduced and commercialized in the market worldwide.

However, the LTE technology has not improved the vulnerability that the IMSI that is the identification parameter value of User Equipment (UE) in an initial attach section for LTE network access is exposed in plain text, despite the continued technology upgrade and security vulnerability supplementation. Further, the corresponding vulnerability has existed since the early LTE standards release.

When UE accesses the LTE network in the state where the corresponding vulnerability is not improved, the identification parameters may be leaked and the UE may be attacked by a third party in the initial attach section, which may lead to problems, such as tracking of the UE and infringement of privacy.

In the meantime, the domestic and overseas telecommunication industries have been researching and developing LTE communication drones using LTE networks since 2016. In particular, the communication industry improves a drone operation environment by using the LTE network and attempts to converge the existing industry and the drone based on the improved drone operation environment. When the drone is operated by using the LTE network, the existing disadvantage of the drone (a flight distance of the frequency communication drone operated in the frequency communication scheme is limited to a radio wave transception distance) may be overcome and the operation range may be expanded.

The foregoing LTE communication drone may overcome the limitation of the frequency communication drone in the related art to be usable in various fields. However, when the LTE network is used, the usage field of the LTE communication drone may also be limited due to the vulnerability that the IMSI of the LTE communication drone is exposed.

Accordingly, the technology of overcoming the security vulnerability in the LTE network may be required in the art.

PRIOR ART LITERATURE

Patent Document (Patent Document 1) Korean Patent Application Laid-Open No. 10-2017-0112709

SUMMARY OF THE INVENTION

The present disclosure is conceived in response to the background art, and has been made in an effort to provide a security authentication technique with improved security for an identification parameter of a controlled device.

The technical objects of the present disclosure are not limited to the foregoing technical objects, and other non-mentioned technical objects will be clearly understood by those skilled in the art from the description below.

According to several exemplary embodiments of the present disclosure for solving the foregoing object, a computer program stored in a computer-readable storage medium is disclosed. The computer program includes commands which cause a processor of a control device to execute steps below, the steps including: acquiring International Mobile Station Identity (IMSI) related to a Subscriber Identity Module (SIM) and location information of a controlled device from the controlled device; calculating a hash value obtained by hashing the IMSI by using a hash function; generating first signature data in which the hash value and the location information are encrypted with a private key of the control device by using an asymmetric key algorithm; generating first encryption data obtained by encrypting the first signature data with a public key of a home subscriber server by using the asymmetric key algorithm; and transmitting a connection request message including the first encryption data to the home subscriber server.

The acquiring of the IMSI related to the SIM and the location information of the controlled device from the controlled device may include receiving the IMSI and the location information from the controlled device by using a wired secure channel.

The steps may further include: when the home subscriber server determines a connection acceptance for the connection request message, receiving a connection response message including second encryption data from the home subscriber server; extracting a random value, a first authentication token and a Temporary Mobile Subscriber Identity (TMSI) from the second encryption data; and transmitting the random value, the first authentication token, and the first TMSI to the controlled device by using a wired secure channel.

The second encryption data may be the data obtained by generating, by the home subscriber server, second signature data obtained by encrypting the random value, the first authentication token, and the first TMSI with a private key of the home subscriber server by using the asymmetric key algorithm, and encrypting the second signature data with a public key of the control device by using the asymmetric key algorithm.

The extracting of the random value, the first authentication token, and the first TMSI from the second encryption data included in the connection response message may include: acquiring the second signature data by decrypting the second encryption data with the private key of the control device by using the asymmetric key algorithm; and acquiring the random value, the first authentication token, and the first TMSI by decrypting the second signature data with the public key of the home subscriber server by using the asymmetric key algorithm.

The first authentication token may be acquired by the home subscriber server by inputting first input data including the authentication key related to the SIM and the random value of the controlled device to an Evolved Packet System-Authentication and Key Agreement (EPS-AKA) algorithm.

The first authentication token may be used for a verification procedure in which the controlled device determines whether the home subscriber server has transmitted the first authentication token.

The verification procedure may be performed by verification operations below of the controlled device, and the verification operations may include: when the controlled device receives the random value, the first authentication token, and the first TMSI, acquiring a second authentication token generated by inputting second input data including an authentication key related to the SIM and the random value of the controlled device to the EPS-AKA algorithm; and determining whether the home subscriber server has transmitted the first authentication token according to whether the first authentication token is the same as the second authentication token.

The determining whether the home subscriber server has transmitted the first authentication token according to whether the first authentication token is the same as the second authentication token may include determining that the home subscriber server has transmitted the first authentication token when it is recognized that the first authentication token is the same as the second authentication token.

The EPS-AKA algorithm may further generate a RES (response) value and a secret key according to the input of the second input data, and the first TMSI, the RES value, and the secret key may be used in the authentication procedure of the controlled device.

The authentication procedure may be performed by authentication operations below in the controlled device and a mobility management entity managing communication of the controlled device, and the authentication operations may include: generating, by the controlled device, an authentication request message obtained by encrypting the RES value and the first TMSI by using the secret key; transmitting, by the controlled device, the authentication request message to the mobility management entity; when the mobility management entity receives the authentication request message, decrypting the authentication request message by using a secret key pre-stored in the mobility management entity in order to extract the RES value and the first TMSI from the authentication request message; and authenticating, by the mobility management entity, the controlled device based on a result of a comparison between the RES value and the first TMSI extracted from the authentication request message and an XRES (Expected Response) value and a second TMSI pre-stored in a memory of the mobility management entity.

The authenticating of, by the mobility management entity, the controlled device based on the result of the comparison between the RES value and the first TMSI extracted from the authentication request message and the XRES (Expected Response) value and the second TMSI pre-stored in a memory of the mobility management entity may include completing the authentication of the controlled device when it is recognized that the first TMSI is the same as the second TMSI and it is recognized that the RES value is the same as the XRES value.

According to several exemplary embodiments of the present disclosure for solving the foregoing object, a computer program stored in a computer-readable storage medium is disclosed. The computer program may include commands which cause a processor of a home subscriber server to execute steps below, the steps including: receiving a connection request message including first encryption data encrypted based on an asymmetric key algorithm from a control device that controls the controlled device; extracting a first hash value and location information of the controlled device from the first encryption data; determining whether a communication network subscription state of the controlled device is valid by comparing the first hash value with a second hash value pre-stored in a memory; and when it is determined that the communication network subscription state of the controlled device is valid, determining a mobility management entity which is to receive a pre-connection request message based on the location information of the controlled device.

The first encryption data may be the data obtained by generating, by the control device, first signature data obtained by encrypting the first hash value and the location information of the controlled device with a private key of the control device by using the asymmetric key algorithm, and encrypting the first signature data with a public key of the home subscriber server by using the asymmetric key algorithm.

The extracting of the first hash value and the location information of the controlled device of the first encryption data may include: acquiring the first signature data by decrypting the first encryption data with a private key of the home subscriber server by using the asymmetric key algorithm; and acquiring the first hash value and the location information by decrypting the first signature data with a public key of the control device by using the asymmetric key algorithm.

The steps may further include: acquiring an International Mobile Station Identity related to a subscriber identity module (SIM) and an authentication key of the controlled device before receiving the connection request message from the control device; and calculating the second hash value obtained by hashing the IMSI by using a hash function, and storing the second hash value and the authentication key in the memory.

The steps may further include: when it is determined that the communication network subscription state of the controlled device is valid, transmitting a connection response message corresponding to the connection request message to the control device; and when it is determined that the communication network subscription state of the controlled device is valid, transmitting a pre-connection request message to the mobility management entity so as to perform authentication between the controlled device and the mobility management entity.

The transmitting of the connection response message corresponding to the connection request message to the control device when it is determined that the communication network subscription state of the controlled device is valid may include: acquiring a first authentication token by inputting first input data including the authentication key related to the SIM and a random value of the controlled device to an Evolved Packet System-Authentication and Key Agreement (EPS-AKA) algorithm; generating a Temporary Mobile Subscriber Identity (TMSI) corresponding to the IMSI; and transmitting a connection response message including second encryption data obtained by encrypting the random value, the TMSI, and the first authentication token to the control device.

The transmitting of the connection response message including the second encryption data obtained by encrypting the random value, the TMSI, and the first authentication token to the control device may include: generating second signature data obtained by encrypting the random value, the TMSI, and the first authentication token with a private key of the home subscriber server by using the asymmetric key algorithm; and generating the second encryption data encrypted with a public key of the control device by using the asymmetric key algorithm.

The transmitting of the pre-connection request message to the mobility management entity so as to perform authentication between the controlled device and the mobility management entity when it is determined that the communication network subscription state of the controlled device is valid may include: acquiring an XRES value and a secret key by inputting first input data including an authentication key related to the SIM and the random value of the controlled device to the EPS-AKA algorithm; generating the TMSI corresponding to the IMSI; and generating the pre-connection request message including the XRES value, the TMSI, and the secret key used for performing the authentication between the controlled device and the mobility management entity.

The determining of the mobility management entity which is to receive the pre-connection request message based on the location information of the controlled device when it is determined that the communication network subscription state of the controlled device is valid may include: recognizing at least one mobility management entity located within a predetermined radius from a location of the controlled device based on the location information of the controlled device; and determining at least one mobility management entity located within the predetermined radius as the mobility management entity which is to receive the pre-connection request message.

The technical solutions obtainable from the present disclosure are not limited to the foregoing solutions, and other non-mentioned solution means will be clearly understood by those skilled in the art from the description below.

The present disclosure may solve the problems, such as tracking and information exposure of a controlled device, through the security authentication technique with improved security for an IMSI of the controlled device.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
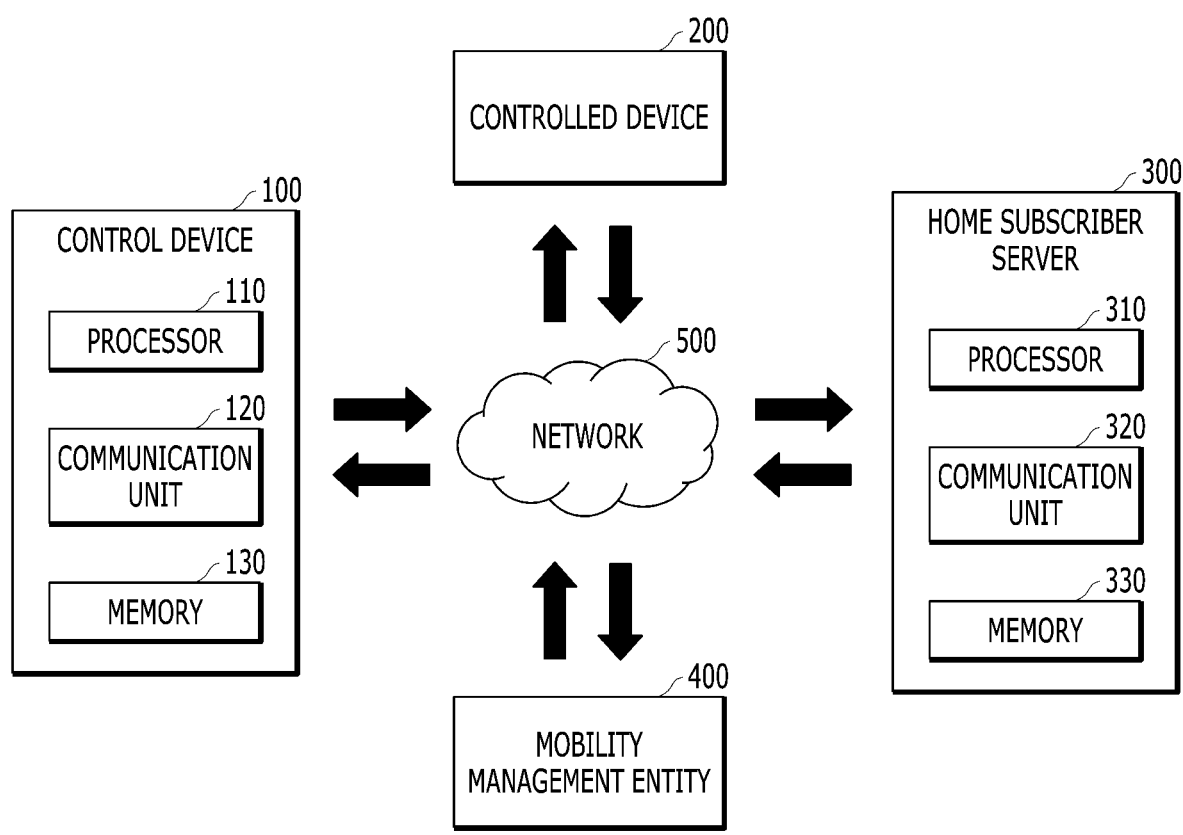
FIG. 1 is a diagram illustrating an example of a security authentication system including a control device, a controlled device, a home subscriber server, and a mobility management entity in which various aspects of the present disclosure are implementable.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include all of the aspects and the equivalents thereof. In particular, an "exemplary embodiment", an "example", an "aspect", an "illustration", and the like used in the present specification may not be construed to be better or have an advantage compared to a predetermined described aspect, an aspect having a different design, or designs.

Various aspects and characteristics will be presented by a system that may include one or more devices, terminals, servers, devices, components, and/or modules. The fact that various systems may include additional apparatuses, terminals, servers, devices, components, and/or modules, and/or the fact that various systems may not include all of the apparatuses, terminals, servers, devices, components, and modules discussed in relation to the drawings shall also be understood and recognized.

Terms, "computer program", "component", "module", "system", and the like used in the present specification may be compatibly used, and indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers.

The components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Hereinafter, the same or similar constituent element is denoted by the same reference numeral regardless of a reference numeral, and a repeated description thereof will be omitted. Further, in describing the exemplary embodiment disclosed in the present disclosure, when it is determined that a detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

A term used in the present specification is for describing the exemplary embodiments, and does not intend to limit the present disclosure. In the present specification, a singular form includes a plural form as well, unless otherwise mentioned. A term "comprises" and/or "comprising" used in the specification does not exclude the existence or an addition of one or more other constituent elements, in addition to the mentioned constituent element.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

Terms information" and "data" used in the present specification may be frequently used to be exchangeable with each other.

Suffixes, " . . . module" and " . . . unit" for a constituent element used for the description below are given or mixed in consideration of only easiness of the writing of the specification, and the suffix itself does not have a discriminated meaning or role.

An object and effect of the present disclosure and technical configurations for achieving them will be apparent with reference to the exemplary embodiments described below in detail together with the accompanying drawings. In describing the present disclosure, when it is determined that detailed description of known function or configurations unnecessarily obscures the subject matter of the present disclosure, the detailed description may be omitted. Further, the terms used in the description are defined in consideration of the function in the present disclosure and may vary depending on an intention or usual practice of a user or operator.

However, the present disclosure is not limited to the exemplary embodiments disclosed below, but may be implemented in various different forms. However, the present exemplary embodiments are provided only to make the present disclosure complete, and to fully inform the scope of the disclosure to those skilled in the art, and the present disclosure is only defined by the scope of the claims. Accordingly, the definition should be made based on the content throughout the present specification.

The scope of the steps in the claims of the present disclosure is generated by the functions and features described in each step, and unless the precedence relationship of the order is specified in each step, the scope of the right is not affected by the order of description of each step. For example, in the claims described with steps including step A and step B, even though step A is described before step B, the scope of the right is not limited to that step A must precede step B.

FIG. 1 is a diagram illustrating an example of a security authentication system including a control device, a controlled device, a home subscriber server, a mobility management entity in which various aspects of the present disclosure are implementable.

Referring to FIG. 1, the security authentication system may include a control device 100, a controlled device 200, a home subscriber server 300, a mobility management entity 400, and a network 500. However, the foregoing constituent elements are not essential for implementing the security authentication system, so that the security authentication system may include more or less constituent elements than the foregoing listed constituent elements.

According to several exemplary embodiments of the present disclosure, the control device 100 may be the device for controlling the controlled device 200. For example, the control device 100 may mean a Ground Control System (GCS). However, the present disclosure is not limited thereto. In the meantime, the controlled device 200 may mean the device controlled by the control device 100 as described above. For example, the controlled device 200 may be a drone or an unmanned aerial vehicle. However, the present disclosure is not limited thereto.

The control device 100 may include a predetermined type of computer system or computer device, for example, a microprocessor, a main frame computer, a digital processor, a portable device, and a device controller. Further, the control device 100 may include a mobile phone, a smart phone, a notebook computer (laptop computer), Personal Digital Assistant (PDA), a slate PC, a tablet PC, an Ultrabook, a wearable device (for example, a watch-type terminal (smart watch), a glass-type terminal (smart glass) and Head Mounted Display (HMD)) and the like. However, the present disclosure is not limited thereto.

The control device 100 may include a processor 110, a communication unit 120, and a memory 130. However, the foregoing constituent elements are not essential for implementing the control device 100, so that the control device 100 may include more or less constituent elements than the foregoing listed constituent elements. Herein, each of the constituent elements may be configured as a separate chip, module, or device, and may be included in one device.

The processor 110 of the control device 100 typically controls the overall operation of the control device 100. The processor 110 may provide the user with appropriate information or function or process appropriate information or function by processing the signal, the data, the information and the like input or output by the foregoing constituent elements or driving the application program stored in the memory 130.

The processor 110 may control at least a part of the constituent elements of the control device 100 in order to drive an application program stored in the memory 130. Further, the processor 110 may combine at least two or more of the constituent elements included in the control device 100 and operate the combination in order to drive the application program.

The communication unit 120 of the control device 100 may include one or more modules which enable the control device 100 and the controlled device 200, and the control device 100 and the home subscriber server 300 to communicate with each other. Further, the communication unit 120 may include one or more modules connecting the control device 100 to one or more networks.

The communication unit 120 of the control device 100 according to several exemplary embodiments of the present disclosure may wirely or wirelessly communicate with the controlled device 200. Further, the communication unit 120 may transceive control data for controlling the controlled device 200 with the controlled device 200. Further, the communication unit 120 may receive an identification parameter for initially registering the controlled device 200 to a communication network (herein, an LTE network) from the controlled device 200. For example, the communication unit 120 may receive International Mobile Station Identity (IMSI) that is an identification parameter from the controlled device 200. Herein, the communication unit 120 may receive the IMSI through a wired secure channel for the security of the controlled device 200. However, the present disclosure is not limited thereto.

When the processor 110 of the control device 100 according to several exemplary embodiments of the present disclosure receives the identification parameters for the initial registration of the controlled device 200 to the communication network from the controlled device 200, the processor 110 of the control device 100 may perform a security authentication process for initially registering the controlled device 200 to the communication network.

The method of performing, by the processor 110 of the control device 100, the security authentication process will be described below with reference to FIGS. 2 to 4.

According to several exemplary embodiments of the present disclosure, the home subscriber server 300 may mean a Home Subscribe Server (HSS) serving as a database of a communication network subscriber. In particular, the home subscriber server 300 may store information about the subscribers who subscribed to the communication network in the form of subscription information. Further, the home subscriber server 300 may manage all of the subscriber information for call/session control, such as subscriber registration/change management, authentication, authorization, location, session, routing, and billing. For example, the home subscriber server 300 may correspond to a Call Session Control Function (CSCF) of the IMS network. However, the present disclosure is not limited thereto.

The home subscriber server 300 may include, for example, a predetermined type of computer system or computer device, for example, a microprocessor, a main frame computer, a digital processor, a portable device, and a device controller. However, the present disclosure is not limited thereto.

The home subscriber server 300 may include a processor 310, a communication unit 320, and a memory 330. However, the foregoing constituent elements are not essential for implementing the home subscriber server 300, so that the home subscriber server 300 may include more or less constituent elements than the foregoing listed constituent elements. Herein, each of the constituent elements may be configured as a separate chip, module, or device, and may be included in one device.

The processor 310 of the home subscriber server 300 typically controls the overall operation of the home subscriber server 300. The processor 310 may provide the user with appropriate information or function or process appropriate information or function by processing the signal, the data, the information and the like input or output by the foregoing constituent elements or driving the application program stored in the memory 330.

The processor 310 may control at least a part of the constituent elements of the home subscriber server 300 in order to drive an application program stored in the memory 330. Further, the processor 310 may combine at least two or more of the constituent elements included in the home subscriber server 300 and operate the combination in order to drive the application program.

The communication unit 320 of the home subscriber server 300 may include one or more modules which enable the home subscriber server 300 and the control device 100, and the home subscriber server 300 and the mobility management entity 400 to communicate with each other. Further, the communication unit 320 may include one or more modules connecting the home subscriber server 300 to one or more networks.

The memory 330 of the home subscriber server 300 may store a program for the operation of the processor 310, and temporally or permanently store input/output data. The memory 330 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The memory 330 may be operated under the control of the processor 310.

The memory 330 according to several exemplary embodiments of the present disclosure may be an Authentication Center (AuC). Further, the memory 330 may have stored communication network subscriber information (that is, information about a subscribed terminal).

According to several exemplary embodiments of the present disclosure, the communication unit 320 of the home subscriber server 300 may receive a connection request message for initially registering the controlled device 200 to the communication network from the control device 100. In this case, the processor 310 may determine whether a communication network subscription state of the controlled device 200 is valid by using the subscriber information stored in the memory 330. Further, when the processor 310 determines that the communication network subscription state of the controlled device 200 is valid, the processor 310 may control the communication unit 320 so as to transmit a connection response message to the control device 100, and transmit a pre-connection request message to the mobility management entity 400.

For example, the processor 310 of the home subscriber server 300 may receive the connection request message including the encrypted IMSI of the controlled device 200 from the control device 100 through the communication unit 320. Further, when the processor 310 determines that the communication network subscription state of the controlled device 200 is valid, the processor 310 may transmit the connection response message including encrypted data of a Temporary Mobile Subscriber Identity (TMSI) corresponding to the IMSI to the control device 100.

Accordingly, when the home subscriber server 300 and the control device 100 transceives the message in the process of the initial registration of the controlled device 200 to the communication network, security for the identification parameter of the controlled device 200 may be improved by using the encrypted data. However, the present disclosure is not limited thereto.

Herein, the process of determining, by the processor 310 of the home subscriber server 300, whether the communication network subscription state of the controlled device 200 is valid according to the reception of the connection request message from the control device 100 through the communication unit 320 and the process of transmitting the connection response message and the pre-connection request according to the determination that the communication network subscription state of the controlled device 200 is valid may be included in the security authentication process according to several exemplary embodiments of the present disclosure.

The method of performing, by the processor 310 of the home subscriber server 300, the security authentication process will be described below with reference to FIGS. 2, and 7 to 10.

According to several exemplary embodiments of the present disclosure, the mobility management entity 400 may mean a Mobility Management Entity (MME) serving as an exchange device of the communication network subscriber. In particular, the mobility management entity 400 may authenticate a terminal (herein, the controlled device 200) subscribed to the communication network, process a Non Access Stratum (NAS) signal for the connection to the core network, and provide connectivity between the terminal and a Packet Data Network (PDN). However, the present disclosure is not limited thereto.

According to several exemplary embodiments of the present disclosure, the mobility management entity 400 and the controlled device 200 may transceive data and perform an authentication procedure.

In particular, the mobility management entity 400 may receive a pre-connection request message used for the authentication procedure from the home subscriber server 300. In the meantime, the controlled device 200 may receive data used for a verification procedure and the authentication procedure from the control device 100. Further, the controlled device 200 may perform the authentication procedure by completing a verification procedure by using the data received from the control device 100 and then transmitting an authentication request message to the mobility management entity 400.

The method of performing, by the controlled device 200, the verification procedure will be described below with reference to FIG. 5. Further, the method of performing, by the mobility management entity 400 and the controlled device 200, the authentication procedure will be described below with reference to FIG. 6.

The network 500 according to several exemplary embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network 500 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

The network 500 according to the exemplary embodiments of the present disclosure may be configured regardless of its communication mode, such as a wired mode and a wireless mode, and may be configured of various communication networks, such as a Personal Area Network (PAN) and a Wide Area Network (WAN). Further, the network may be the publicly known World Wide Web (WWW), and may also use a wireless transmission technology used in PAN, such as Infrared Data Association (IrDA) or Bluetooth.

The technologies described in the present specification may be used in other networks, as well as the foregoing networks.

The various exemplary embodiments described herein may be implemented in a recording medium and a storage medium readable by a computer or a similar device by using, for example, software, hardware, or a combination thereof.

According to the implementation by hardware, the exemplary embodiment described herein may be implemented by using at least one of Application Specific Integrated Circuits (ASICs), Digital Signal processors (DSPs), Digital Signal Processing Devices (DSPDs), Programmable Logic Devices (PLDs), Field Programmable Gate Arrays (FPGAs), processors, controllers, micro-controllers, microprocessors, and other electric units for performing functions. In some cases, the exemplary embodiments described in the present specification may be implemented by the processor itself of each of the control device 100, the controlled device 200, the home subscriber server 300, and the mobility management entity 400.

According to the implementation by software, the exemplary embodiments, such as the procedure and the function, described in the present specification may be implemented with separate software modules. Each of the software modules may perform one or more functions and operations described in the present specification. A software code may be implemented with a software application written in an appropriate program language. The software code may be stored in the memory of each of the control device 100, the controlled device 200, the home subscriber server 300, and the mobility management entity 400, and may be executed by the processor of the control device 100, the controlled device 200, the home subscriber server 300, and the mobility management entity 400.

Figure 2:
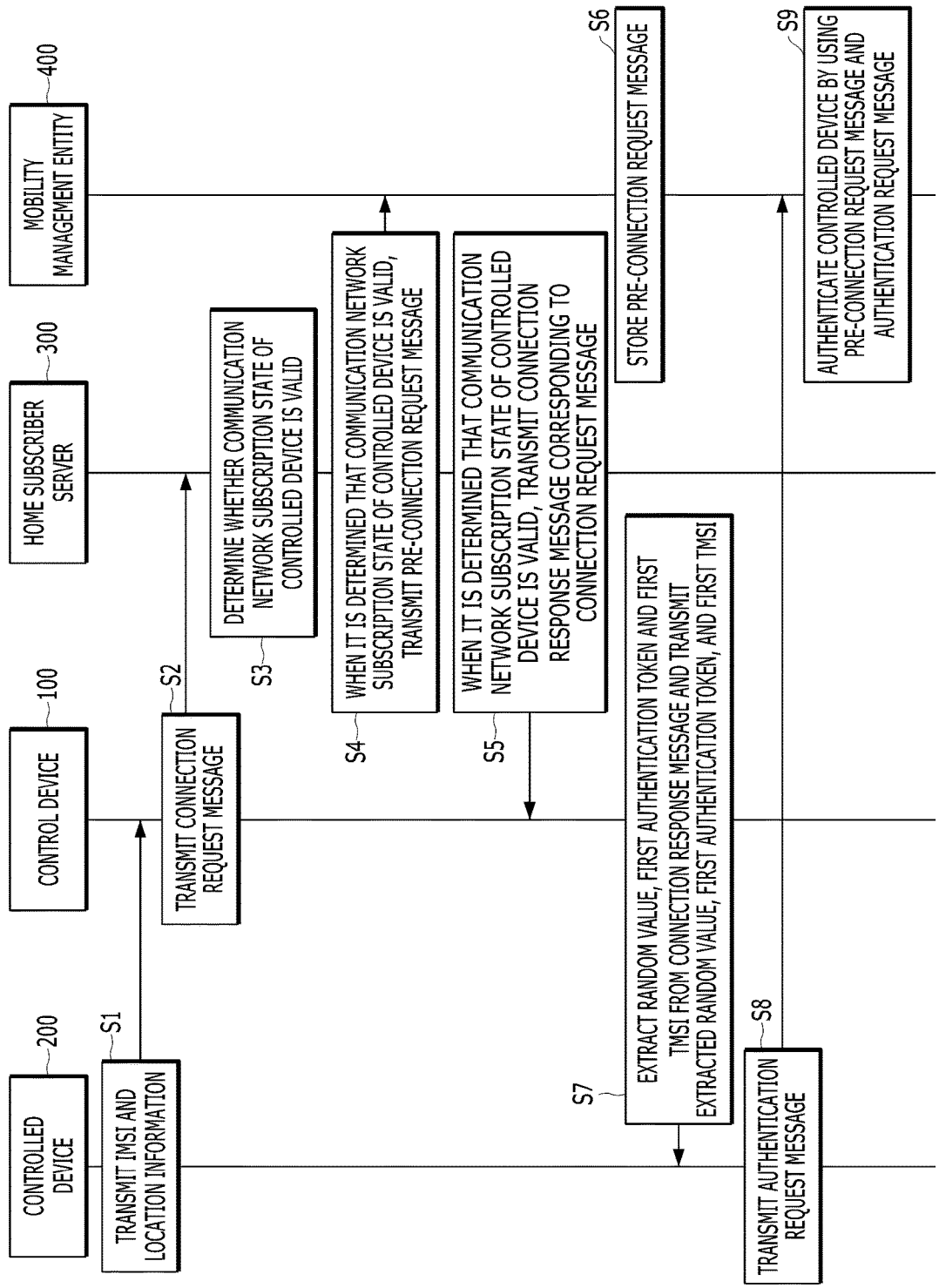
FIG. 2 is a flowchart for describing an example of a security authentication technique according to several exemplary embodiments of the present disclosure.

FIG. 2 is a flowchart for describing an example of a security authentication technique according to several exemplary embodiments of the present disclosure.

A flow of the security authentication technique performed by each of the control device 100, the controlled device 200, the home subscriber server 300, and the mobility management entity 400 which may be included in the security authentication system according to several exemplary embodiments of the present disclosure will be described briefly with reference to FIG. 2.

Referring to FIG. 2, the controlled device 200 may transmit IMSI and location information to the control device 100 (S1).

In particular, when the controlled device 200 subscribes to the communication network service, the controlled device 200 may receive a Subscriber Identity Module (SIM) to which an identification parameter is allocated. Further, the controlled device 200 may transmit the IMSI (that is, the IMSI allocated to the SIM) related to the SIM and the location information on the current location of the controlled device 200 to the control device 100 for the initial registration to the communication network.

In more particular, the controlled device 200 may transmit the IMSI and the location information to the control device 100 by using a wired secure channel. For example, the controlled device 200 may transmit the IMSI and the location information to the control device 100 through USB connection. However, the present disclosure is not limited thereto.

Accordingly, the controlled device 200 may prevent the exposure of the identification parameter incurable when the identification parameter is transmitted through a wireless channel.

When the control device 100 receives the IMSI and the location information from the controlled device 200, the control device 100 may encrypt the IMSI and the location information.

In particular, the control device 100 may acquire a hash value for the IMSI of the controlled device 200 by using a hash function. The control device 100 may generate first signature data by signing (encoding) the hash value and the location information with a private key of the control device 100. The control device 100 may generate first encryption data obtained by encrypting the first signature data with a public key of the home subscriber server 300.

Herein, when the control device 100 generates the first signature data by using the private key of the control device 100 or generates the first encryption data by using the public key of the home subscriber server 300, an asymmetric key algorithm may be used. Herein, the asymmetric key algorithm is the encryption algorithm requiring two types of keys (for example, a public key and a private key) for encryption and decryption. That is, the data encrypted with the public key may be decrypted with the private key, and the data encrypted (signed) with the private key may be decrypted with the public key.

In the meantime, the control device 100 generating the first encryption data may transmit a connection request message including the first encryption data to the home subscriber server 300 (S2).

That is, the control device 100 transmits the message including the encrypted data to the home subscriber server 300, thereby improving security for the IMSI and the location information of the controlled device 200.

The home subscriber server 300 may acquire the IMSI and an authentication key related to the SIM of the controlled device before receiving the connection request message from the control device 100. In this case, the home subscriber server 300 may calculate a second hash value obtained by hashing the IMSI by using the hash function, and store the second hash value and the authentication key in the memory. Herein, the authentication key is the key value, such as the IMSI, allocated to the SIM provided when the controlled device 200 subscribes to the communication network service.

That is, the home subscriber server 300 is the server related to the provision of the communication network service, and in the case where a specific terminal subscribes to the communication network, the home subscriber server 300 may have stored information related to the SIM provided to the specific terminal.

In the meantime, when the home subscriber server 300 receives the connection request message from the control device 100, the home subscriber server 300 may extract the first hash value and the location information from the first encryption data included in the connection request message.

In particular, the home subscriber server 300 may acquire the first hash value and the location information by decrypting the first encryption data through the asymmetric key algorithm.

The method of acquiring, by the home subscriber server 300, the first hash value and the location information will be described below with reference to FIG. 8.

The home subscriber server 300 acquiring the first hash value may determine whether a communication network subscription state of the controlled device 200 is valid by comparing the second hash value previously stored in the memory with the first hash value (S3).

When the home subscriber server 300 determines that the communication network subscription state of the controlled device 200 is valid, the home subscriber server 300 may transmit a pre-connection request message to the mobility management entity 400 (S4). In particular, the home subscriber server 300 may transmit the pre-connection request message to at least one mobility management entity 400 existing at the location closest to the controlled device 200 based on the location information of the controlled device 200 included in the connection request message.

Accordingly, the home subscriber server 300 transmits the pre-connection request message only to at least one mobility management entity 400 adjacent to the controlled device 200 to reduce the amount of traffic usage and the amount of resource usage used for the message transmission. In addition, since the home subscriber server 300 transmits the pre-connection request message only to the minimum mobility management entity 400, it is possible to minimize the risk of leakage of the data included in the pre-connection request message.

In the meantime, when the home subscriber server 300 determines that the communication network subscription state of the controlled device 200 is valid, the home subscriber server 300 may transmit a connection response message corresponding to the connection request message to the control device 100 (S5).

Herein, each of the pre-connection request message and the connection response message may include data used for an authentication procedure between the controlled device 200 and the mobility management entity 400. In addition, the connection response message may include data used for performing, by the controlled device 200, a verification procedure for the home subscriber server 300.

The authentication procedure and the verification procedure will be described below with reference to FIGS. 5 and 6.

When the mobility management entity 400 receives the pre-connection request message from the home subscriber server 300, the mobility management entity 400 may store the pre-connection request message in the memory (S6).

In the meantime, when the control device 100 receives the connection response message from the home subscriber server 300, the control device 100 may extract a random value, a first authentication token, and a first TMSI from the connection response message and transmit the extracted random value, first authentication token, and first TMSI to the controlled device 200 (S7). Herein, the first authentication token is the token (or value) output from the mutual authentication algorithm (in particular, Evolved Packet System-Authentication and Key Agreement (EPS-AKA) algorithm), and is the token for the mutual authentication. In particular, when the mutual authentication algorithm receives first input data, the mutual authentication algorithm may output the first authentication token. Further, when the mutual authentication algorithm receives second input data that is the same as the first input data, the mutual authentication algorithm may output a second authentication token that is the same as the first authentication token.

The mutual authentication between the different terminals (or devices) may be performed by using the characteristic of the mutual authentication algorithm. For example, a first terminal may share a part of the input data with a second terminal, and receive the second authentication token (the token output by inputting, by the second terminal, second data to the mutual authentication algorithm). Further, the first terminal may acquire the first authentication token output by inputting the first input data to the mutual authentication algorithm. Further, the first terminal may compare the first authentication token with the second authentication token, and when it is recognized that the first authentication token is the same as the second authentication token, the first terminal may perform authentication (or verification) for the second terminal. In the meantime, the second terminal may receive the first authentication token from the first terminal, compare the received first authentication token with the second authentication token acquired by the second terminal, and perform the authentication for the first terminal. However, the present disclosure is not limited thereto.

The method of extracting, by the control device 100, the random value, the first authentication token, and the first TMSI from the connection response message will be described below with reference to FIG. 4.

The controlled device 200 may verify the home subscriber server 300 by using the random value and the first authentication token. Hereinafter, the method of verifying, by the controlled device 200, the home subscriber server 300 by using the random value and the first authentication token will be described below with reference to FIG. 5.

When the controlled device 200 completes the verification of the home subscriber server 300, the controlled device 200 may transmit an authentication request message including the first TMSI to the mobility management entity 400 (S8).

In this case, the mobility management entity 400 may authenticate the controlled device 200 by using the pre-connection request message pre-stored in the memory and the authentication request message (S9). Hereinafter, the method of authenticating, by the mobility management entity 400, the controlled device 200 by using the pre-connection request message and the authentication request message will be described below with reference to FIG. 6.

Figure 3:
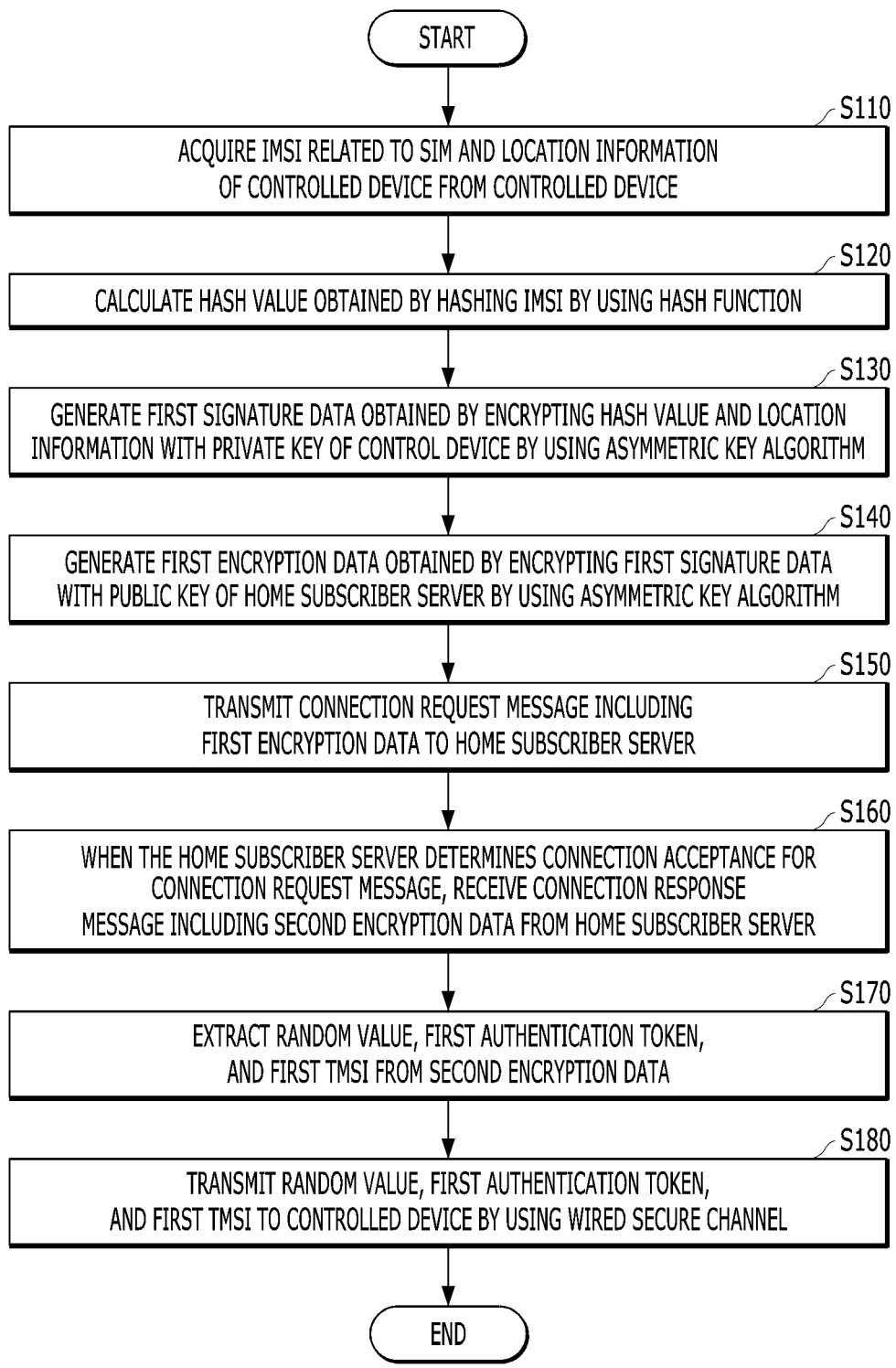
FIG. 3 is a flowchart for describing an example of a method of performing security authentication by a control device according to several exemplary embodiments of the present disclosure.

FIG. 3 is a flowchart for describing an example of a method of performing security authentication by a controlled device according to several exemplary embodiments of the present disclosure. FIG. 4 is a flowchart for describing a particular example of the method of performing security authentication by the control device according to several exemplary embodiments of the present disclosure.

Referring to FIG. 3, the processor 110 of the control device 100 may acquire the IMSI related to the SIM and the location information of the controlled device 200 from the controlled device 200 (S110).

In particular, the processor 110 may receive the IMSI and the location information from the controlled device 200 by using the wired secure channel. For example, the processor 110 may receive the IMSI and the location information from the controlled device 200 by using the USB channel through the communication unit 120. However, the present disclosure is not limited thereto.

That is, since each of the control device 100 and the controlled device 200 transceives the IMSI and the location information by using the wired secure channel, it is possible to prevent the leakage of the IMSI and location information to improve security of the IMSI and location information.

The processor 110 of the control device 100 may calculate a hash value obtained by hashing the IMSI by using the hash function (S120). Further, the processor 110 of the control device 100 may acquire first signature data obtained by encrypting the hash value and the location information with the private key of the control device 100 by using the asymmetric key algorithm (S130). Further, the processor 110 may generate first encryption data obtained by encrypting the first signature data with the public key of the home subscriber server 300 by using the asymmetric key algorithm (S140).

The processor 110 of the control device 100 may transmit the connection request message including the first encryption data to the home subscriber server 300 (S150).

That is, since the control device 100 encrypts the IMSI and the location information of the controlled device 200 to be transmitted to the home subscriber server 300 and then transmits the connection request message including the encrypted data (that is, the first encryption data), it is possible to improve security of the IMSI and the location information.

Even when the encrypted data is stolen (that is, leaked and decrypted) by a malicious user, only the hash value that is the hashed IMSI of the controlled device 200 is leaked, so that it is possible to prevent the leakage of the IMSI of the controlled device 200.

In the meantime, when the home subscriber server 300 determines to accept the connection for the connection request message, the processor 110 of the control device 100 may receive a connection response message including the second encryption data from the home subscriber server 300. In this case, the processor 110 of the control device 100 may extract the random value, the first authentication token, and the first TMSI from the second encryption data (S170). Herein, the second encryption data may be the encrypted data by using the asymmetric key algorithm. That is, the processor 110 of the control device 100 may decrypt the second encryption data by using the asymmetric key algorithm.

Figure 4:
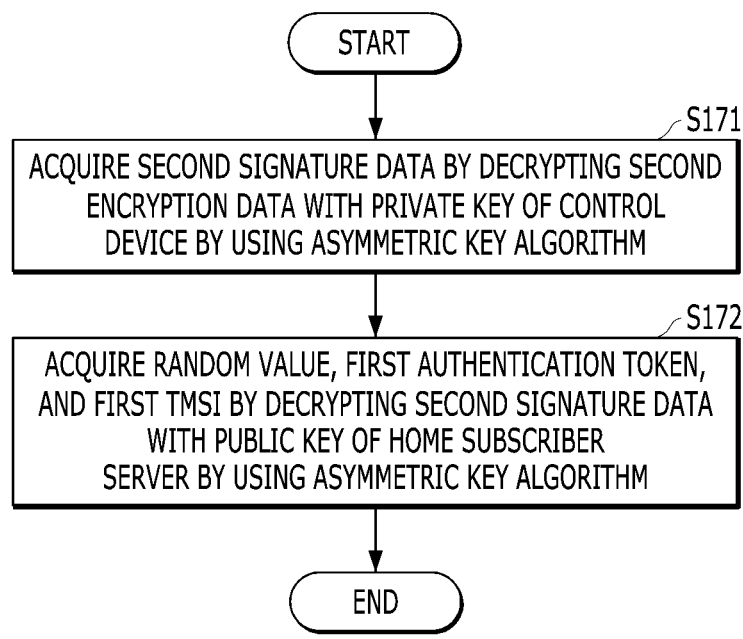
FIG. 4 is a flowchart for describing a particular example of the method of performing security authentication by the control device according to several exemplary embodiments of the present disclosure.

In particular, referring to FIG. 4, the processor 110 of the control device 100 may decrypt the second encryption data with the private key of the control device 100 by using the asymmetric key algorithm and acquire second signature data (S171). Then, the processor 110 may acquire the random value, the first authentication token, and the first TMSI by decrypting the second signature data with the public key of the home subscriber server 300 by using the asymmetric key algorithm (S172).

That is, the second encryption data may be the data obtained by generating, by the home subscriber server 300, the second signature data obtained by encrypting the random value, the first authentication token and the first TMSI with the private key of the home subscriber server 300 by using the asymmetric key algorithm, and encrypting the second signature data with the public key of the control device 100 by using the asymmetric key algorithm.

Accordingly, the home subscriber server 300 encrypts the random value, the first authentication token, and the first TMSI to be transmitted to the control device 100 and then transmits the connection response message including the encrypted data (that is, the second encryption data), so that it is possible to improve security of the random value, the first authentication token, and the first TMSI.

In the meantime, the first authentication token means the token acquired by the home subscriber server 300 by inputting, by the home subscriber server 300, the first input data including the authentication key related to the SIM of the controlled device 200 and the random value to the EPS-AKA algorithm. Herein, the first input data may further include other values, in addition to the authentication key and the random value. For example, the first input data may include Sequence Number (SQN) generated by the home subscriber server 300 and Serving Network Identity (SN ID) received from the mobility management entity 400, in addition to the authentication key and the random value. However, the present disclosure is not limited thereto.

The first authentication token may be used in the verification procedure in which the controlled device 200 determines whether the home subscriber server 300 has transmitted the first authentication token. Hereinafter, the verification procedure will be described with reference to FIG. 5.

Referring back to FIG. 3, the control device 100 may transmit the random value, the first authentication token, and the first TMSI to the controlled device 200 by using the wired secure channel (S180). For example, the processor 110 may transmit the random value, the first authentication token, and the first TMSI to the controlled device 200 by using the USB channel through the communication unit 120. However, the present disclosure is not limited thereto.

That is, each of the control device 100 and the controlled device 200 transceive the random value, the first authentication token, and the first TMSI by using the wired secure channel, so that it is possible to prevent the leakage of the random value, the first authentication token, and the first TMSI and improve security of the random value, the first authentication token, and the first TMSI.

Figure 5:
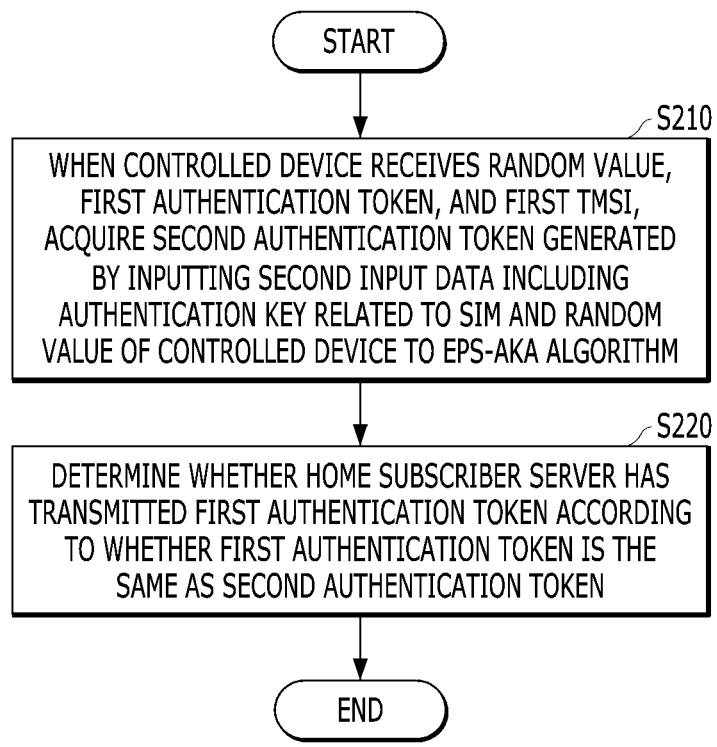
FIG. 5 is a flowchart for describing a verification procedure according to several exemplary embodiments of the present disclosure.

FIG. 5 is a flowchart for describing the verification procedure according to several exemplary embodiments of the present disclosure.

Referring to FIG. 5, when the controlled device 200 receives the random value, the first authentication token, and the first TMSI from the control device 100, the controlled device 200 may acquire a second authentication token generated by inputting the second input data including the authentication key related to the SIM of the controlled device 200 and the random value to the EPS-AKA algorithm (S210). Herein, the second input data may further include other values, in addition to the authentication key and the random value. For example, the second input data may include the authentication key, the random value, SQN, and SN ID. However, the present disclosure is not limited thereto.

The EPS-AKA algorithm may further generate a RES (response) value and a secret key according to the input of the second input data. That is, the controlled device 200 may acquire the second authentication token, the RES value, and the secret key by inputting the second input data to the EPS-AKA algorithm.

In the meantime, the controlled device 200 may use the RES value and the secret key acquired by inputting the first TMSI and the second input data received from the control device 100 to the EPS-AKA algorithm for the authentication procedure of the controlled device 200. Herein, the RES value may mean an output value (that is, the response value) output when the second input data is input to the EPS-AKA algorithm. Further, the secret key may mean the key used for encrypting and decrypting the message used in the authentication procedure. Hereinafter, the authentication procedure will be described below with reference to FIG. 6.

The controlled device 200 may determine whether the home subscriber server 300 has transmitted the first authentication token according to whether the first authentication token is the same as the second authentication token (S220).

In particular, when it is recognized that the first authentication token is the same as the second authentication token, the controlled device 200 may determine that the home subscriber server 300 transmits the first authentication token. That is, when the first authentication token is the same as the second authentication token, the controlled device 200 may complete the verification for the home subscriber server 300.

Then, the controlled device 200 may perform the authentication procedure with the mobility management entity 400 according to the completion of the verification for the home subscriber server 300.

In the meantime, when it is recognized that the first authentication token is not the same as the second authentication token, the controlled device 200 may determine that the home subscriber server 300 does not transmit the first authentication token. In this case, the controlled device 200 may stop the security authentication process for initialing registering the controlled device 200 to the communication network.

Accordingly, only when the verification for the home subscriber server 300 is completed, the controlled device 200 performs a next authentication process, thereby improving reliability of the security authentication process of the present disclosure.

Figure 6:
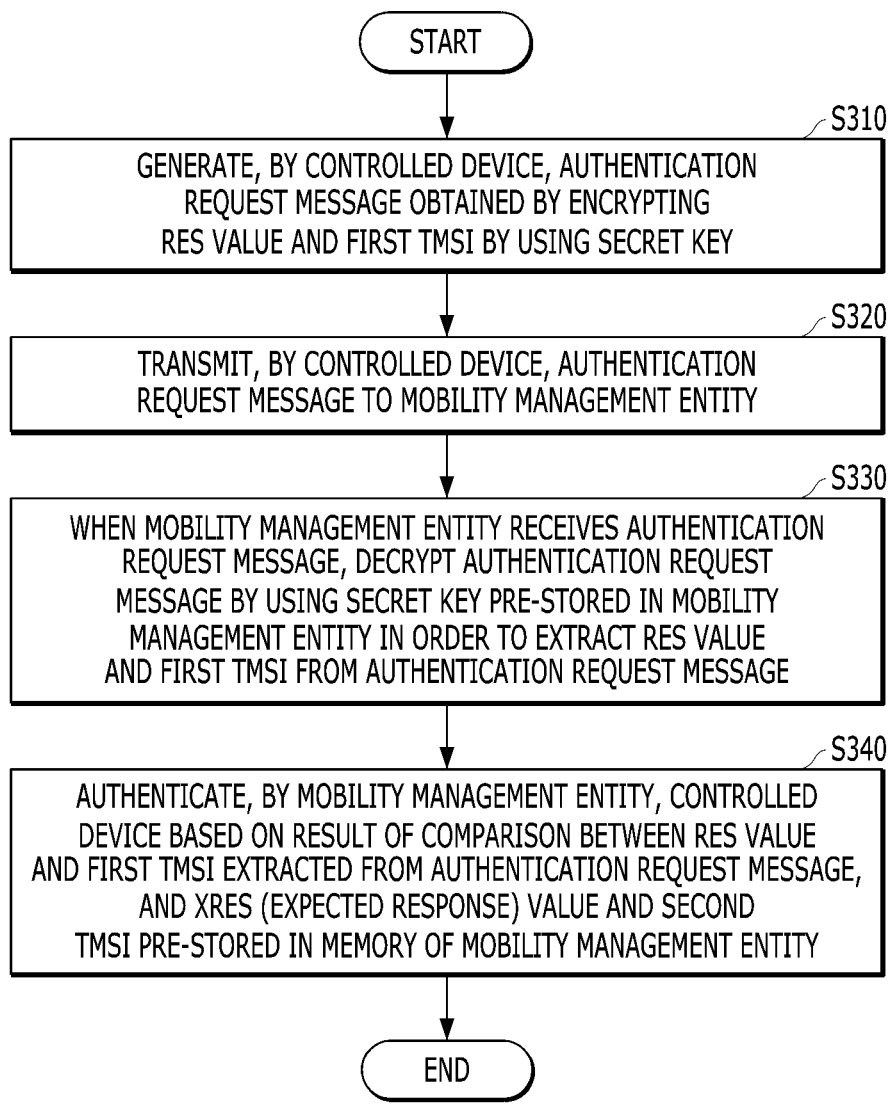
FIG. 6 is a flowchart for describing an authentication procedure according to several exemplary embodiments of the present disclosure.

FIG. 6 is a flowchart for describing the authentication procedure according to several exemplary embodiments of the present disclosure.

According to several exemplary embodiments of the present disclosure, the control device 100 may transmit the connection request message for initially registering the controlled device 200 to the communication network to the home subscriber server 300. In this case, the home subscriber server 300 may determine whether the communication network subscription state of the controlled device 200 is valid.

Then, when it is determined that the communication network subscription state of the controlled device 200 is valid, the home subscriber server 300 may transmit the pre-connection request message to the mobility management entity 400. Herein, the pre-connection request message may include an Expected Response (XRES) value, and a second TMSI. Herein, the XRES value may mean an expected output value (that is, an expected response value) expected to be output when the second input data is input to the EPS-AKA algorithm.

In the meantime, when the mobility management entity 400 receives the pre-connection request message from the home subscriber server 300, the mobility management entity 400 may store the XRES value and the second TMSI included in the pre-access request message in the memory. Herein, the XRES value and the second TMSI stored in the memory of the mobility management entity 400 may be used for performing, by the mobility management entity 400, the authentication for the controlled device 200.

In the meantime, referring to FIG. 6, the controlled device 200 may generate an authentication request message in which the RES value and the first TMSI are encrypted by using the secret key according to the completion of the verification for the home subscriber server 300 (S310). Then, the controlled device 200 may transmit the authentication request message to the mobility management entity 400 (S320).

In the meantime, when the mobility management entity 400 receives the authentication request message, the mobility management entity 400 may decrypt the authentication request message by using the secret key prestored in the mobility management entity 400 in order to extract the RES value and the first TMSI from the authentication request message (S330).

Then, the mobility management entity 400 may authenticate the controlled device 200 based on a result of the comparison between the RES value extracted from the authentication request message and the first TMSI, and the XRES value prestored in the memory of the mobility management entity 400 and the second TMSI (S340).

In particular, when the mobility management entity 400 recognizes that the first TMSI is the same as the second TMSI and the RES value is the same as the XRES value, the mobility management entity 400 may complete the authentication for the controlled device 200.

That is, when the expected response value (XRES) transmitted to the mobility management entity 400 by the home subscriber server 300 is the same as the actual response value (RES) generated by the controlled device 200, the mobility management entity 400 may complete the authentication for the controlled device 200.

Figure 7:
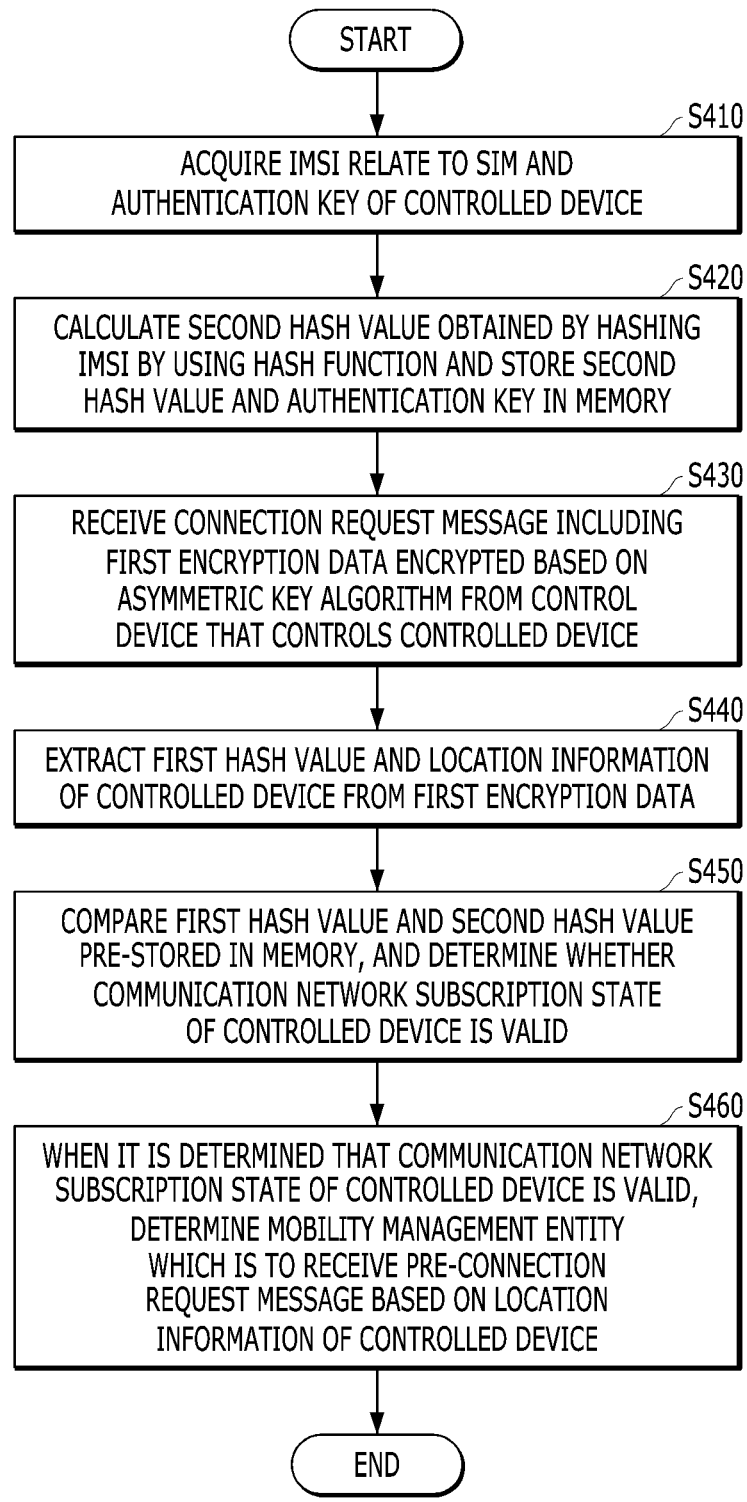
FIG. 7 is a flowchart for describing an example of a method of performing security authentication by a home subscriber server according to several exemplary embodiments of the present disclosure.

FIG. 7 is a flowchart for describing an example of a method of performing security authentication by the home subscriber server according to several exemplary embodiments of the present disclosure. FIG. 8 is a flowchart for describing a particular example of a method of performing security authentication by the home subscriber server according to several exemplary embodiments of the present disclosure. FIG. 9 is a flowchart for describing another particular example of the method of performing security authentication by the home subscriber server according to several exemplary embodiments of the present disclosure.

Referring to FIG. 7, the processor 310 of the home subscriber server 300 may acquire the IMSI and the authentication key related to the SIM of the controlled device 200 (S410).

In particular, the home subscriber server 300 may acquire information input from a user (or a manager) of the controlled device 200 when subscribing the controlled device 200 to the communication network service. Further, the home subscriber server 300 may acquire the information on the SIM provided to the controlled device 200 subscribed to the communication network service. Herein, the identification parameter (that is, the IMSI and the authentication key) may be allocated (or stored) to the SIM.

The processor 310 of the home subscriber server 300 may calculate a second hash value obtained by hashing the IMSI by using the hash function. Then, the processor 310 may store the second hash value and the authentication key in the memory 330 (S420).

In the meantime, the processor 310 of the home subscriber server 300 may receive the connection request message including the first encryption data encrypted based on the asymmetric key algorithm from the control device 100 controlling the controlled device 200 through the communication unit 320 (S430). In this case, the processor 310 of the home subscriber server 300 may extract the first hash value and the location information of the controlled device 200 from the first encryption data (S440).

Figure 8:
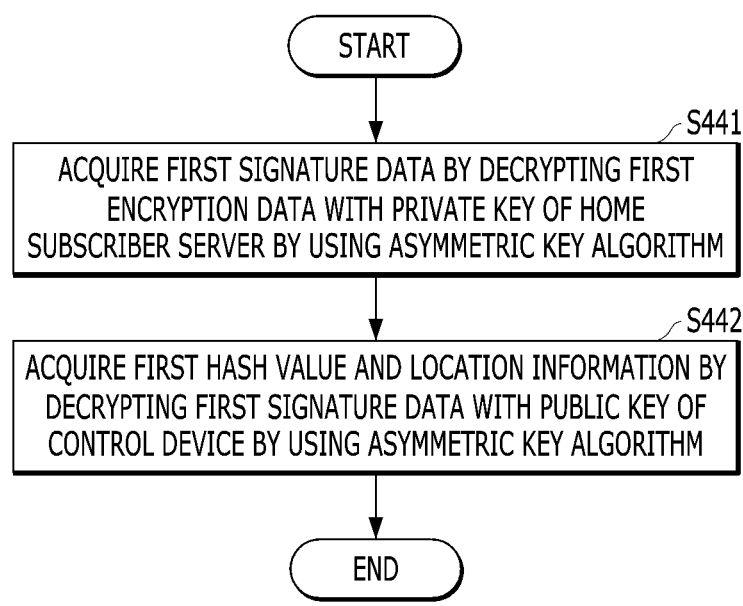
FIG. 8 is a flowchart for describing a particular example of the method of performing security authentication by the home subscriber server according to several exemplary embodiments of the present disclosure.
Figure 9:
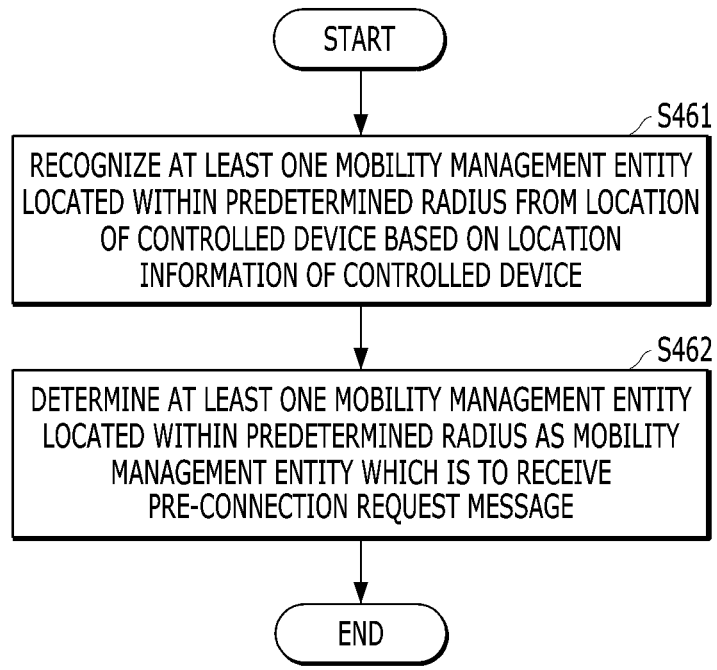
FIG. 9 is a flowchart for describing another particular example of the method of performing security authentication by the home subscriber server according to several exemplary embodiments of the present disclosure.

In particular, referring to FIG. 8, the processor 310 of the home subscriber server 300 may acquire the first signature data by decrypting the first encryption data with the private key of the home subscriber server 300 by using the asymmetric key algorithm (S441). Then, the processor 310 may acquire the first hash value and the location information by decrypting the first signature data with the public key of the control device 100 by using the asymmetric key algorithm (S442).

That is, the first encryption data may be the data obtained by generating, by the control device 100, the first signature data obtained by encrypting the first hash value and the location information of the controlled device 200 with the private key of the control device 100 by using the asymmetric key algorithm, and encrypting the first signature data with the public key of the home subscriber server 300 by using the asymmetric key algorithm.

Accordingly, since the control device 100 encrypts the IMSI and the location information of the controlled device 200 to be transmitted to the home subscriber server 300 and then transmits the connection request message including the encrypted data (that is, the first encryption data), it is possible to improve security of the IMSI and the location information.

Referring back to FIG. 7, the processor 310 of the home subscriber server 300 may determine whether the communication network subscription state of the controlled device 200 is valid by comparing the first hash value and the second hash value prestored in the memory (S450).

In particular, when it is recognized that the first hash value is the same as the second hash value, the processor 310 of the home subscriber server 300 may determine that the communication network subscription state of the controlled device 200 is valid.

In the meantime, when the processor 310 of the home subscriber server 300 determines that the communication network subscription state of the controlled device 200 is valid, the processor 310 of the home subscriber server 300 may determine the mobility management entity 400 which is to receive the pre-connection request message based on the location information of the controlled device 200 (S460).

In particular, referring to FIG. 9, the processor 310 of the home subscriber server 300 may recognize at least one mobility management entity 400 located within a predetermined radius from the location of the controlled device 200 based on the location information of the controlled device 200 (S461). Then, the processor 310 may determine at least one mobility management entity 400 located within the predetermined radius as the mobility management entity which is to receive the pre-connection request message (S462).

That is, the processor 310 of the home subscriber server 300 may transmit the pre-connection request message only to at least one mobility management entity 400 adjacent to the controlled device 200. In this case, the processor 310 may reduce the amount of traffic usage and the amount of resource usage used for the message transmission. In addition, since the processor 310 transmits the pre-connection request message only to the minimum mobility management entity 400, it is possible to minimize the risk of leakage of the data included in the pre-connection request message.

Figure 10:
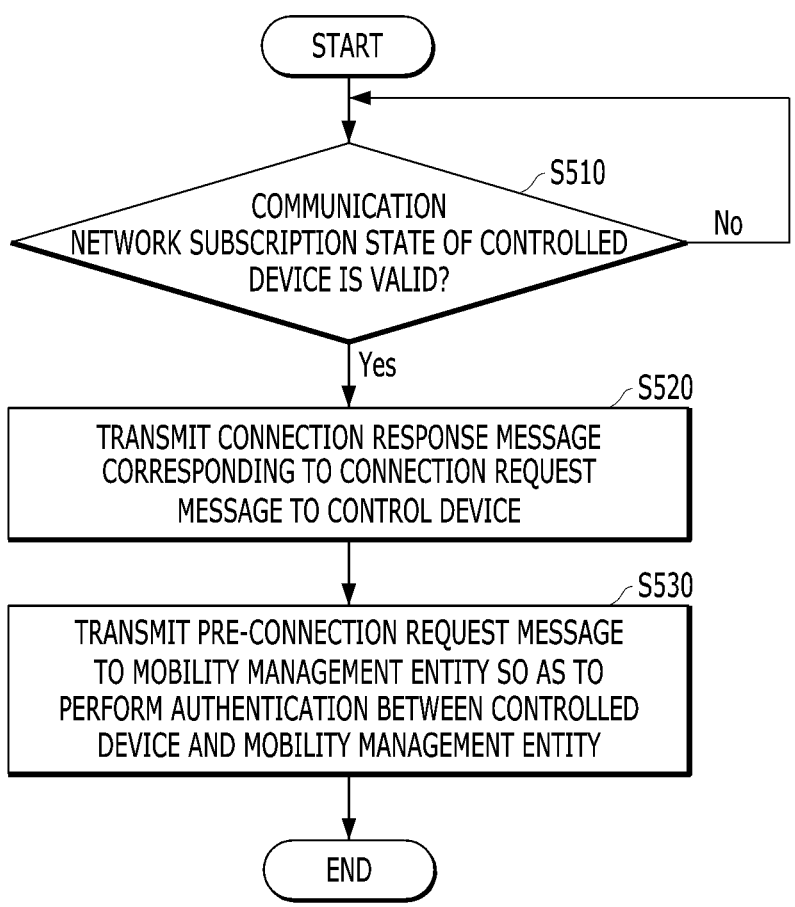
FIG. 10 is a flowchart for describing an additional example of the method of performing security authentication by the home subscriber server according to several exemplary embodiments of the present disclosure.

FIG. 10 is a flowchart for describing an additional example of the method of performing security authentication by the home subscriber server according to several exemplary embodiments of the present disclosure.

According to several exemplary embodiments of the present disclosure, the processor 310 of the home subscriber server 300 may receive the connection request signal from the control device 100 through the communication unit 320. In this case, the processor 310 may acquire the first hash value and the location information of the controlled device 200 by decrypting the first encryption data included in the connection request signal.

Referring to FIG. 10, the processor 310 of the home subscriber server 300 may determine whether the communication network subscription state of the controlled device 200 is valid by comparing the first hash value and the second hash value prestored in the memory 330 of the home subscriber server 300 (S510).

When it is determined that the communication network subscription state of the controlled device 200 is invalid (NO in S510), the processor 310 of the home subscriber server 300 may stand by until a connection request signal related to the controlled device 200 of which the communication network subscription state is valid is received.

In the meantime, when it is determined that the communication network subscription state of the controlled device 200 is valid (YES in S510), the processor 310 of the home subscriber server 300 may transmit the connection response message corresponding to the connection request message to the control device (S520).

In particular, the processor 310 of the home subscriber server 300 may acquire the first authentication token by inputting the first input data including the authentication key and the random value related to the SIM of the controlled device 200 to the EPS-AKA algorithm. Further, the processor 310 may generate the TMSI corresponding to the IMSI.

The processor 310 of the home subscriber server 300 may generate the second signature data obtained by encrypting the random value, the TMSI, the first authentication token with the private key of the home subscriber server 300 by using the asymmetric key algorithm. The processor 310 may generate the second encryption data encrypted with the public key of the control device 100 by using the asymmetric key algorithm. Then, the processor 310 may control the communication unit 320 so as to transmit the connection response message including the second encryption data obtained by encrypting the random value, the TMSI, and the first authentication token to the control device 100.

In the meantime, the processor 310 of the home subscriber server 300 may transmit the pre-connection request message to the mobility management entity 400 so as to perform the authentication between the controlled device 200 and the mobility management entity 400 according to the determination that the communication network subscription state of the controlled device 200 is valid (S530).

In particular, the processor 310 of the home subscriber server 300 may acquire the XRES value and the secret key by inputting the first input data including the authentication key and the random value related to the SIM of the controlled device to the EPS-AKA algorithm. Further, the processor 310 may generate the TMSI corresponding to the IMSI. Herein, the XRES value may mean an expected output value (that is, an expected response value) expected to be output when the second input data is input to the EPS-AKA algorithm.

The processor 310 of the home subscriber server 300 may generate the pre-connection request message including the XRES value, the TMSI, and the secret key used for performing the authentication between the controlled device 200 and the mobility management entity 400. Further, the processor 310 may control the communication unit 320 so as to transmit the pre-connection request message including the XRES value, the TMSI, and the secret key to the mobility management entity 400.

Figure 11:
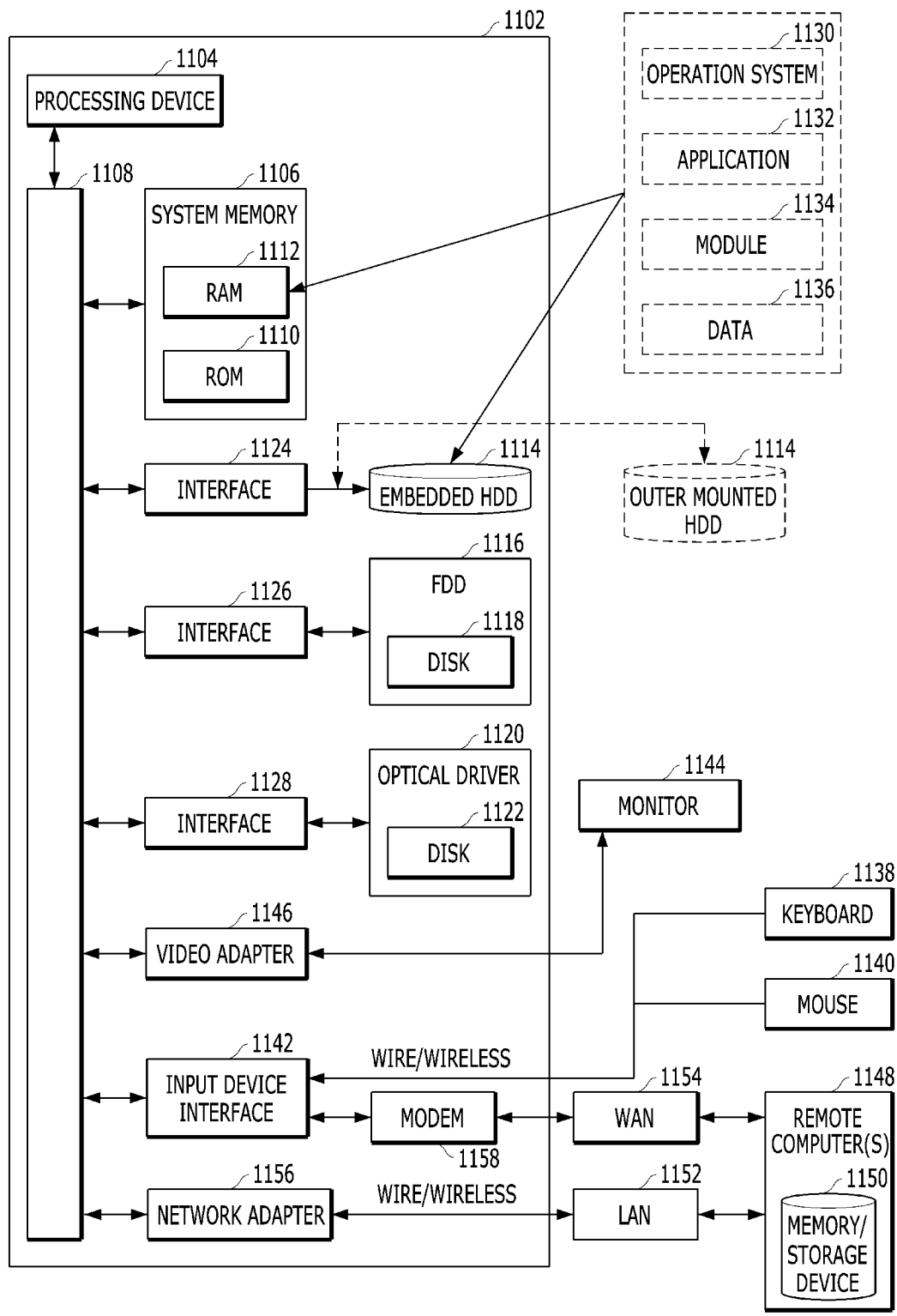
FIG. 11 is a simple and general schematic diagram illustrating an example of a computing environment in which exemplary embodiments of the present disclosure are implementable.

FIG. 11 is a simple and general schematic diagram illustrating an example of a computing environment in which exemplary embodiments of the present disclosure are implementable.

The present disclosure has been generally described in relation to a computer executable command executable in one or more computers, but those skilled in the art will appreciate well that the present disclosure is combined with other program modules and/or be implemented by a combination of hardware and software.

In general, a module in the present specification includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A computer program stored in a non-transitory computer readable storage medium, in which the computer program includes commands which cause a processor of a control device to execute steps below, the steps comprising:
   acquiring International Mobile Station Identity (IMSI) related to a Subscriber Identity Module (SIM) and location information of a controlled device from the controlled device;
   calculating a hash value obtained by hashing the IMSI by using a hash function;
   generating first signature data in which the hash value and the location information are encrypted with a private key of the control device by using an asymmetric key algorithm;
   generating first encryption data obtained by encrypting the first signature data with a public key of a home subscriber server by using the asymmetric key algorithm; and
   transmitting a connection request message including the first encryption data to the home subscriber server,
   wherein the steps further comprises:
   receiving a connection response message including second encryption data from the home subscriber server, when the home subscriber server determines a connection acceptance for the connection request message;
   extracting a random value, a first authentication token and a Temporary Mobile Subscriber Identity (TMSI) from the second encryption data; and
   transmitting the random value, the first authentication token, and the first TMSI to the controlled device by using a wired secure channel.

2. The computer program of claim 1, wherein the second encryption data is the data obtained by generating, by the home subscriber server, second signature data obtained by encrypting the random value, the first authentication token, and the first TMSI with a private key of the home subscriber server by using the asymmetric key algorithm, and encrypting the second signature data with a public key of the control device by using the asymmetric key algorithm.

3. The computer program of claim 2, wherein the extracting of the random value, the first authentication token, and the first TMSI from the second encryption data included in the connection response message includes:

acquiring the second signature data by decrypting the second encryption data with the private key of the control device by using the asymmetric key algorithm; and acquiring the random value, the first authentication token, and the first TMSI by decrypting the second signature data with the public key of the home subscriber server by using the asymmetric key algorithm.

4. The computer program of claim 1, wherein the first authentication token is acquired by the home subscriber server by inputting first input data including an authentication key related to the SIM and the random value of the controlled device to an Evolved Packet System-Authentication and Key Agreement (EPS-AKA) algorithm.

5. The computer program of claim 1, wherein the first authentication token is used for a verification procedure in which the controlled device determines whether the home subscriber server has transmitted the first authentication token.

6. The computer program of claim 5, wherein the verification procedure is performed by verification operations below of the controlled device, and the verification operations include:

when the controlled device receives the random value, the first authentication token, and the first TMSI, acquiring a second authentication token generated by inputting second input data including an authentication key related to the SIM and the random value of the controlled device to an EPS-AKA algorithm; and determining whether the home subscriber server has transmitted the first authentication token according to whether the first authentication token is the same as the second authentication token.

7. The computer program of claim 6, wherein the determining whether the home subscriber server has transmitted the first authentication token according to whether the first authentication token is the same as the second authentication token includes determining that the home subscriber server has transmitted the first authentication token when it is recognized that the first authentication token is the same as the second authentication token.

8. The computer program of claim 6, wherein the EPS-AKA algorithm further generates a RES (response) value and a secret key according to the input of the second input data, and the first TMSI, the RES value, and the secret key are used in the authentication procedure of the controlled device.

9. The computer program of claim 8, wherein the authentication procedure is performed by authentication operations below in the controlled device and a mobility management entity managing communication of the controlled device, and the authentication operations include:
generating, by the controlled device, an authentication request message obtained by encrypting the RES value and the first TMSI by using the secret key;
transmitting, by the controlled device, the authentication request message to the mobility management entity;
when the mobility management entity receives the authentication request message, decrypting the authentication request message by using a secret key pre-stored in the mobility management entity in order to extract the RES value and the first TMSI from the authentication request message; and
authenticating, by the mobility management entity, the controlled device based on a result of a comparison between the RES value and the first TMSI extracted from the authentication request message and an XRES (Expected Response) value and a second TMSI pre-stored in a memory of the mobility management entity.

10. The computer program of claim 9, wherein the authenticating of, by the mobility management entity, the controlled device based on the result of the comparison between the RES value and the first TMSI extracted from the authentication request message and the XRES (Expected Response) value and the second TMSI pre-stored in a memory of the mobility management entity includes completing the authentication of the controlled device when it is recognized that the first TMSI is the same as the second TMSI and it is recognized that the RES value is the same as the XRES value.

11. A computer program stored in a non-transitory computer readable storage medium, in which the computer program includes commands which cause a processor of a home subscriber server to execute steps below, the steps comprising:

receiving a connection request message including first encryption data encrypted based on an asymmetric key algorithm from a control device that controls a controlled device;

extracting a first hash value and location information of the controlled device from the first encryption data;

determining whether a communication network subscription state of the controlled device is valid by comparing the first hash value with a second hash value pre-stored in a memory; and when it is determined that the communication network subscription state of the controlled device is valid, determining a mobility management entity which is to receive a pre-connection request message based on the location information of the controlled device.

12. The computer program of claim 11, wherein the first encryption data is the data obtained by generating, by the control device, first signature data obtained by encrypting the first hash value and the location information of the controlled device with a private key of the control device by using the asymmetric key algorithm, and encrypting the first signature data with a public key of the home subscriber server by using the asymmetric key algorithm.

13. The computer program of claim 12, wherein the extracting of the first hash value and the location information of the controlled device of the first encryption data includes:

acquiring the first signature data by decrypting the first encryption data with a private key of the home subscriber server by using the asymmetric key algorithm; and acquiring the first hash value and the location information by decrypting the first signature data with a public key of the control device by using the asymmetric key algorithm.

14. The computer program of claim 11, wherein the steps further include:

acquiring an International Mobile Station Identity related to a subscriber identity module (SIM) and an authentication key of the controlled device before receiving the connection request message from the control device; and calculating the second hash value obtained by hashing the IMSI by using a hash function, and storing the second hash value and the authentication key in the memory.

15. The computer program of claim 14, wherein the steps further include:

when it is determined that the communication network subscription state of the controlled device is valid, transmitting a connection response message corresponding to the connection request message to the control device; and when it is determined that the communication network subscription state of the controlled device is valid, transmitting a pre-connection request message to the mobility management entity so as to perform authentication between the controlled device and the mobility management entity.

16. The computer program of claim 15, wherein the transmitting of the connection response message corresponding to the connection request message to the control device when it is determined that the communication network subscription state of the controlled device is valid includes:

acquiring a first authentication token by inputting first input data including the authentication key related to the SIM and a random value of the controlled device to an Evolved Packet System-Authentication and Key Agreement (EPS-AKA) algorithm;

generating a Temporary Mobile Subscriber Identity (TMSI) corresponding to the IMSI; and transmitting a connection response message including second encryption data obtained by encrypting the random value, the TMSI, and the first authentication token to the control device.

17. The computer program of claim 16, wherein the transmitting of the connection response message including the second encryption data obtained by encrypting the random value, the TMSI, and the first authentication token to the control device includes:

generating second signature data obtained by encrypting the random value, the TMSI, and the first authentication token with a private key of the home subscriber server by using the asymmetric key algorithm; and generating the second encryption data encrypted with a public key of the control device by using the asymmetric key algorithm.

18. The computer program of claim 15, wherein the transmitting of the pre-connection request message to the mobility management entity so as to perform authentication between the controlled device and the mobility management entity when it is determined that the communication network subscription state of the controlled device is valid includes:

acquiring an XRES value and a secret key by inputting first input data including an authentication key related to the SIM and the random value of the controlled device to an EPS-AKA algorithm;

generating a TMSI corresponding to the IMSI; and generating the pre-connection request message including the XRES value, the TMSI, and the secret key used for performing the authentication between the controlled device and the mobility management entity.

19. The computer program of claim 11, wherein the determining of the mobility management entity which is to receive the pre-connection request message based on the location information of the controlled device when it is determined that the communication network subscription state of the controlled device is valid includes:

recognizing at least one mobility management entity located within a predetermined radius from a location of the controlled device based on the location information of the controlled device; and determining the at least one mobility management entity located within the predetermined radius as the mobility management entity which is to receive the pre-connection request message.

* * * * *